United States Patent
Chung et al.

(12)

(10) Patent No.: US 6,476,102 B1
(45) Date of Patent: Nov. 5, 2002

(54) RESIN DISPERSION FOR CATIONIC ELECTRODEPOSITION AND LOW TEMPERATURE CURABLE CATIONIC ELECTRODEPOSITION COATING COMPOSITION INCLUDING THE SAME

(75) Inventors: Hoon Chung; Seung-Jae Baek; Jong-Myung Hong; Ki-Myong Song, all of Gyeonggi-do (KR)

(73) Assignee: DPI Co., Ltd. (KR)

( * ) Notice: Subject to any disclaimer, the term of this patent is extended or adjusted under 35 U.S.C. 154(b) by 0 days.

(21) Appl. No.: 09/927,022

(22) Filed: Aug. 9, 2001

(30) Foreign Application Priority Data

Jun. 13, 2001 (KR) .................................... 2001-0033294

(51) Int. Cl.⁷ ............................ C08K 3/20; C08L 63/02
(52) U.S. Cl. ....................... 523/409; 204/489; 204/502; 204/505; 204/506; 523/411; 523/414; 523/458
(58) Field of Search ................................ 523/409, 411, 523/414, 458; 204/489, 502, 505, 506

(56) References Cited

U.S. PATENT DOCUMENTS

| 5,908,912 A | 6/1999 | Kollah et al. ................ 528/45 |
| 6,147,144 A | 11/2000 | Song et al. ................ 523/408 |

*Primary Examiner*—Robert Dawson
*Assistant Examiner*—D. Aylward
(74) *Attorney, Agent, or Firm*—Ostrolenk, Faber, Gerb & Soffen, LLP

(57) ABSTRACT

Disclosed are a resin dispersion and a low-temperature curable cationic electrodeposition coating composition including the same, in which the dried coating film of the electrodeposition paint is lead-free and has an epoxy-acrylic double-layered structure for displaying excellent properties, and in which an organic solvent content can be minimized. The resin dispersion includes a cationic electrodeposition resin, deionized water, an acid for a neutralization, a reaction product of manganese phosphate and an acid diluted to a concentration of 10% in deionized water and a cationic surfactant. The cationic electrodeposition resin can be prepared in the presence of an organic solvent from (a) a cationic electrodeposition synthetic resin produced by an epoxy-amino addition reaction (b) an acrylic cationic electrodeposition resin having an amino group (c) a fatty acid ester resin synthesized by an esterification reaction of styrene-allylalcohol copolymer and fatty acid and (d) polyurethane cross-linking agent produced from a mixture of blocked polymethylene polyphenyl polyisocyanate and blocked isophorone diisocyanate. The cationic electrodeposition coating composition has a superior low-temperature curability. The cured film has an epoxy-acrylic double-layered structure to give a high functionality, for improving properties such as weather-resistance, yellowing resistance, etc.

16 Claims, No Drawings

RESIN DISPERSION FOR CATIONIC ELECTRODEPOSITION AND LOW TEMPERATURE CURABLE CATIONIC ELECTRODEPOSITION COATING COMPOSITION INCLUDING THE SAME

BACKGROUND OF THE INVENTION

1. Field of the Invention

The present invention relates to a resin dispersion for cationic electrodeposition and a low temperature curable cationic electrodeposition coating composition including the same, and more particularly to a low temperature curable and lead-free cationic electrodeposition coating composition in which the electrodeposited coating film thereof has an epoxy-acrylic double-layered structure to give a high functionality, and in which an organic solvent content is minimized.

2. Description of the Related Arts

Since electrodeposition coating has a good efficiency in application and a high corrosion-resistance and can minimize an environmental contamination because of employing water as a solvent, it is widely used for primer coating of cars, household electric appliances, and industrial machines when compared with a brush coating or a spray coating. Recently and widely used epoxy-based cationic electrodeposition coating composition includes cationic epoxy resin onto which amine is added and blocked polyisocyanate. Researches at home and abroad on cationic electrodeposition paint are concentrated on paints related to energy conservation, safety, and environmental considerations. Also, researches on electrodeposition coating, composition are concentrated on developing highly functional and highly efficient electrodeposition paint having various purposes and characteristics.

Generally, a cationic electrodeposition coating composition includes a tin compound such as dibutyl tin oxide in order to improve a cross-linking reaction between a compound containing hydroxyl functional group with a compound containing isocyanate functional group, along with a lead compound as an anticorrosive pigment in order to improve a corrosion-resistance. However, the lead compound becomes a target of restriction on usage in all over the world as a material inducing an environmental contamination. On July 1996 in Japan, an automobile industrial institute established an independent restriction law named as SHREDDER DUST and suggested each automobile manufacturing company to lessen the utilizing amount of lead in the automobiles. In Europe (EU), a law to restrict on crushing, reclamation, incineration of an automobile containing harmful materials such as lead, cadmium, mercury, etc. during the operation of the automobile, will be positively established on the year after 2003.

Therefore, with the movements on restricting the environmental pollutants, researches on reducing or removing the harmful materials such as lead from a coated and dried film of the electrodeposition coating composition are actively progressed.

U.S. Pat. No. 5,908,912 (issued to Kollah et al.) discloses a formation of a lead-free dried film by applying a salt of bismuth compound and a carboxylic acid including amine into a pigment paste as a reaction catalyst for preparing a cationic electrodeposition coating composition. However, there are problems of coagulation of the bismuth salt during storage and a lowering of the pH of the electrodeposition coating composition because of the addition of a large amount of an acid in order to applying the bismuth compound into the cationic electrodeposition coating composition.

Among the researches, studies on reducing an organic solvent emission during coating operations are being developed. The motive for these studies is the regulation of emission of organic solvents for the protection of the environment. As examples of the regulations related to the regulation of emission of organic solvents, the regulation for volatile organic compounds (VOC) of the Environment Office in U.S. and the atmospheric purification law (TA-Luft) in Germany can be noted. The former establishes a guideline for the emission amount of the organic solvents from a coating composition, while the latter restricts the total amount of the organic solvents discharged from the paint consumed for coating one car. Since about 20% of the total amount of carbon dioxide discharged into the world is due to the coating industry (for example, organic solvent and combustion by means of a drying oven), the coating industry is a major cause of the environmental pollution. Hence, the coating industry has become the subject of supervision.

Presently, as an electrodeposition coating composition of primer coating, an epoxy cationic electrodeposition paint is mainly used. However, the epoxy cationic electrodeposition paint is rich in organic solvents and these solvents are evaporated from the electrodeposition tank, thereby emitting an offensive odor from a work-piece. Also, these solvents are emitted during curing and drying, so environmental pollution problems occur. In U.S. Pat. No. 6,147,144, issued to the present Applicants, a cationic electrodeposition coating composition in which the amount of the organic solvent is minimized, is disclosed.

Further, even though the conventional epoxy cationic electrodeposition paint has a good corrosion-resistance and a good adherence, this is lacking in properties such as a weather-resistance, a yellowing resistance, etc.

SUMMARY OF THE INVENTION

It is an object of the present invention, considering problems, to provide a low-temperature curable resin dispersion of a cationic electrodeposition, of which dried film is free from lead, and which includes a minimized amount of organic solvents and has an epoxy-acrylic double-layered structure to improve a weather-resistance and a yellow resistance, and a method of preparing therof.

Another object of the present invention is providing a cationic electrodeposition coating composition including the above-described resin dispersion of the cationic electrodeposition and a pigment paste composition, and a method of preparing thereof.

To accomplish the above object, there is provided in the present invention a resin dispersion of a cationic electrodeposition including an aqueous dispersion. The aqueous dispersion is prepared by mixing about 35–45 parts by weight of a cationic electrodeposition resin, about 55–65 parts by weight of deionized water, about 0.3–1.5 parts by weight of an acid for neutralization, about 1–5 parts by weight of a reaction product of manganese phosphate and an acid diluted in an deionized water to 10% and about 0.5–1 parts by weight of a cationic surfactant.

The cationic electrodeposition resin is prepared in the presence of an organic solvent from (a) about 40–60% by weight of a cationic electrodeposition synthetic resin produced by an epoxy-amino addition reaction (b) about 5–10% by weight of an acrylic cationic electrodeposition resin having an amino group (c) about 1–3% by weight of a fatty acid ester resin synthesized by an esterification reaction of styrene-allylalcohol copolymer and fatty acid and (d) about 30–50% by weight of polyurethane cross-linking agent produced from a mixture of blocked polymethylene polyphenyl polyisocyanate and blocked isophorone diisocyanate.

The resin dispersion of the cationic electrodeposition is prepared by the following method including the steps of preparing a cationic electrodeposition resin, preparing an Is aqueous dispersion, removing organic solvents having a low boiling point from the aqueous dispersion by extracting and then filtering.

The cationic electrodeposition resin is prepared in the presence of an organic solvent from (a) about 40–60% by weight of a cationic electrodeposition synthetic resin produced by an epoxy-amino addition reaction (b) about 5–10% by weight of an acrylic cationic electrodeposition resin having an amino group (c) about 1–3% by weight of a fatty acid ester resin synthesized by an esterification reaction of styrene-allylalcohol copolymer and fatty acid and (d) about 30–50% by weight of polyurethane cross-linking agent produced from a mixture of blocked polymethylene polyphenyl polyisocyanate and blocked isophorone diisocyanate.

The aqueous dispersion is prepared by mixing about 35–45 parts by weight of the cationic electrodeposition resin, about 55–65 parts by weight of deionized water, about 0.3–1.5 parts by weight of an acid for neutralization, about 1–5 parts by weight of a reaction product of manganese phosphate and an acid diluted in an deionized water to 10% and about 0.5–1 parts by weight of a cationic surfactant.

Preferably, a solid content in the resin dispersion of the cationic electrodeposition is about 30–40% by weight and a mean size of particles contained in this dispersion is about 60 nm or less. And a preferred amount of organic solvents in this dispersion is about 0.5% by weight or less.

The other object of the present invention is accomplished by a cationic electrodeposition coating composition comprising an aqueous dispersion and a pigment paste composition. The aqueous dispersion is prepared by mixing about 35–45 parts by weight of a cationic electrodeposition resin, about 55–65 parts by weight of deionized water, about 0.3–1.5 parts by weight of an acid for neutralization, about 1–5 parts by weight of a reaction product of manganese phosphate and an acid diluted in an deionized water to 1 0% and about 0.5–1 parts by weight of a cationic surfactant.

The cationic electrodeposition resin is prepared in the presence of an organic solvent from (a) about 40–60% by weight of a cationic electrodeposition synthetic resin produced by an epoxy-amino addition reaction (b) about 5–10% by weight of an acrylic cationic electrodeposition resin having an amino group (c) about 1–3% by weight of a fatty acid ester resin synthesized by an esterification reaction of styrene-allylalcohol copolymer and fatty acid and (d) about 30–50% by weight of polyurethane cross-linking agent produced from a mixture of blocked polymethylene polyphenyl polyisocyanate and blocked isophorone diisocyanate.

A method of preparing the cationic electrodeposition coating composition also is provided in the present invention. The cationic electrodeposition coating composition is prepared by preparing a cationic electrodeposition resin, preparing an aqueous dispersion, preparing a resin dispersion of a cationic electrodeposition by removing organic solvents having a low boiling point from the aqueous dispersion by extracting and then filtering, and then mixing thus obtained cationic electrodeposition resin dispersion with a pigment paste composition.

The cationic electrodeposition resin is prepared in the presence of an organic solvent from (a) about 40–60% by weight of a cationic electrodeposition synthetic resin produced by an epoxy-amino addition reaction (b) about 5–10% by weight of an acrylic cationic electrodeposition resin having an amino group (c) about 1–3% by weight of a fatty acid ester resin synthesized by an esterification reaction of styrene-allylalcohol copolymer and fatty acid and (d) about 30–50% by weight of polyurethane cross-linking agent produced from a mixture of polymethylene polyphenyl polyisocyanate and blocked isophorone diisocyanate.

The aqueous dispersion is prepared by mixing about 35–45 parts by weight of the cationic electrodeposition resin, about 55–65 parts by weight of deionized water, about 0.3–1.5 parts by weight of an acid for neutralization, about 1–5 parts by weight of a reaction product of manganese phosphate and an acid diluted in an deionized water to 10% and about 0.5–1 parts by weight of a cationic surfactant.

The preferably employed pigment paste composition includes (a) about 15–30% by weight of pigment grinding vehicle (b) about 2–6% by weight of an anticorrosive pigment and (c) about 0.7–2.3% by weight of dibutyl tin oxide. The ratio of solid content of the pigment/pigment grinding vehicle is in a range of 1/0.2–1/0.45.

Particularly, the pigment grinding vehicle is obtainable from about 25–35% by weight of polyglycidyl ether of bisphenol A, about 5–12% by weight of propyleneglycol monomethyl ether acetate, about 8–15% by weight of partially blocked isocyanate cross-linking agent, about 25–40% by weight of ethylene glycol monobutyl ether, about 10–20% by weight of organic tertiary amino acid salt and about 0–5% by weight of deionized water. Further, the epoxy equivalent weight of the polyglycidyl ether of bisphenol A is in a range of about 900–1200.

In addition, the preferred anticorrosive pigment is at least one selected from the group consisting of bismuth hydroxide, bismuth trioxide, bismuth oxide, aluminum tri-polyphosphate hydrate and magnesium aluminum hydroxide carbonate hydrate.

DETAILED DESCRIPTION OF THE INVENTION

The cationic electrodeposition resin applicable in the present invention is a major component for forming a film in the electrodeposition coating composition. Some of these known cationic electrodeposition resin are illustrated in U.S. Pat. Nos. 3,663,839; 3,984,299; 3,947,338; 3,947,339; and 6,130,274. These film forming resins represent a resin having an amino group formed by an addition reaction of polyepoxide with a primary, secondary, or tertiary amine. In the present invention, as for the cationic electrodeposition synthetic resin formed by an addition reaction of polyepoxide and amine, a resin having the following structural formula can be illustrated:

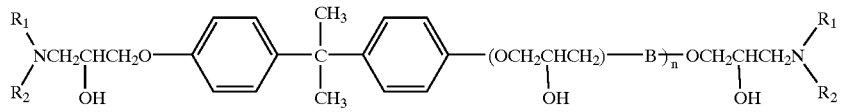

In the above-illustrated structure, R., R2 and B are as follows and n is an integer of 3 or 4.

|  | R$_1$ | R$_2$ | B |
|---|---|---|---|
| N-methyl ethoanol amine | —CH$_3$ | —(CH$_2$)$_2$OH | —[(CH$_2$)$_5$—C(=O)—O]—(CH$_2$)$_5$— |
| diketimine | —CH$_2$N=CCH$_2$CH(CH$_3$)$_2$ \| CH$_3$ | R$_2$=R$_1$ | —⌬—C(CH$_3$)$_2$—⌬— |

If the amount of the cationic electrodeposition synthetic resin having an amino group used is less than 40% by weight, mechanical properties of the dried coating layer are weak, and if the amount of the cationic electrodeposition synthetic resin used exceeds 60% by weight, the manufacture of an aqueous dispersion is difficult. Therefore, the amount of the cationic electrodeposition resin having an amino group used is preferably in the range of about 40–60% by weight, and more preferably about 45–55% by weight.

In addition, as another cationic electrodeposition resin, an acrylic cationic electrodeposition resin having an amino group which is copolymerized with butyl acrylate, methyl acrylate, hydroxy ethyl acrylate, styrene, methyl methacrylate, (N,N-dimethyl)aminoethyl metacrylate, etc., can be illustrated.

If the amount of the acrylic cationic electrodeposition resin used is less than 5% a by weight, a dried coating film having an epoxy-acrylic double-layered structure cannot be obtained, and if the amount of the acrylic cationic electrodeposition resin used exceeds 10% by weight, the epoxy resin and acrylic resin are not compatible, thereby affecting the surface appearance and gloss. Therefore, the amount of the acrylic cationic electrodeposition resin used is preferably in the range of about 5–10% by weight, and more preferably about 7–9% by weight.

Usually these resins having an amino group are used together with a blocked polyisocyanate curing agent. Isocyanate is so completely blocked that it can be mixed with the resin having an amino group. Otherwise, isocyanate is partially blocked in such a manner that it can react with the backbone of a resin. As for the blocking agent of the polyisocyanate compound, at least one compound selected from the group consisting of methyl ethyl ketoxime, dimethyl pyrazole, diethyl malonate, ethylene glycol monobutyl ether and diethylene glycol monobutyl ether can be preferably utilized. As for the blocked polyisocyanate curing agent which can be dissociated at a low temperature, the compounds having the following structural formulae can be illustrated:

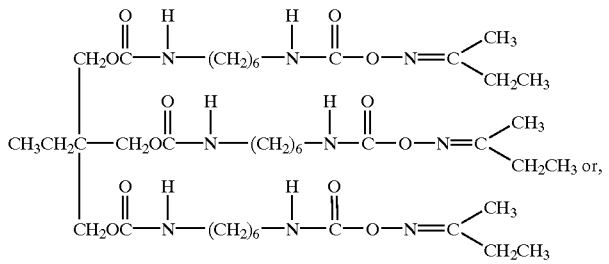

-continued

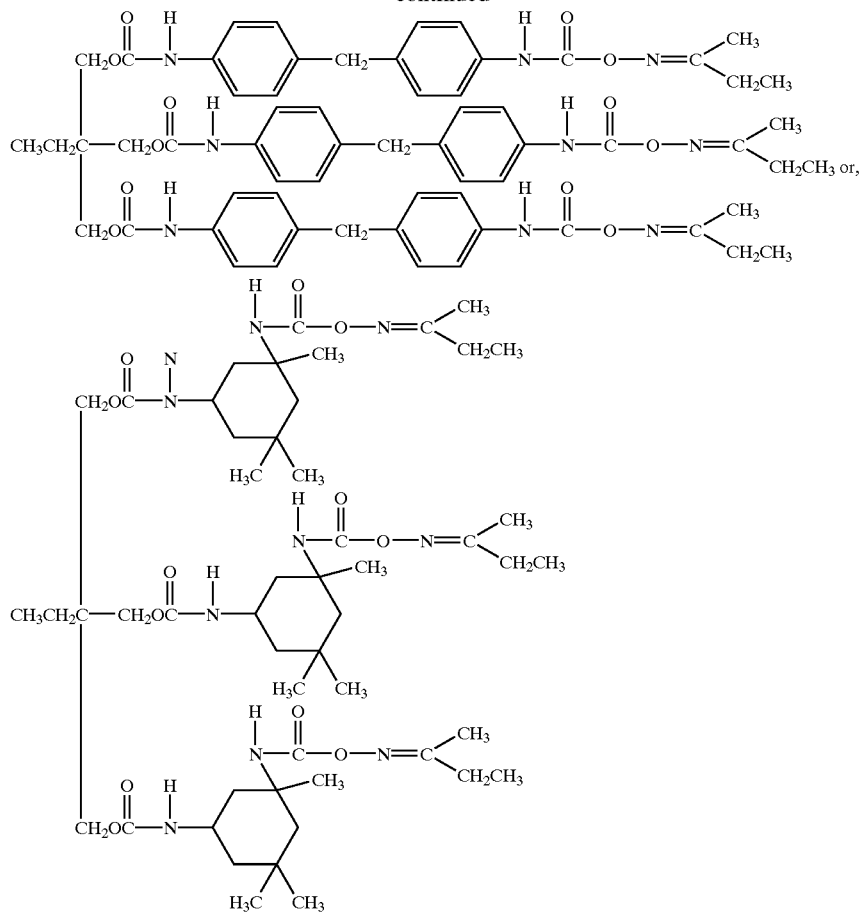

If the amount of the blocked polyisocyanate curing agent used is less than 30% by weight, properties such as pencil hardness, corrosion-resistance, etc., are diminished. If the amount of the blocked polyisocyanate curing agent used exceeds 50% by weight, the preparation of an aqueous dispersion is difficult and properties such as impact-resistance, flexibility, etc., are diminished. Therefore, the amount of the blocked polyisocyanate curing agent used is preferably in the range of about 30–50% by weight, and more preferably 35–45% by weight.

Particularly, the composition of the present invention comprises a fatty acid ester synthetic resin synthesized by an ester reaction of styrene-allylalcohol and fatty acid, in order to improve a smoothness of the electrodeposited coating film and to inhibit a pinhole and cratering characteristic. As for the fatty acid ester synthetic resin, a resin having the following structural formula can be illustrated:

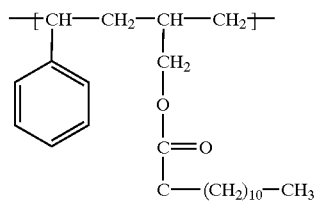

The molecular weight (weight-average molecular weight) of these fatty acid ester resins is preferably in the range between about 2000–40,000, and more preferably is between about 3000–30,000. If the amount of these fatty acid ester resins used is less than 1% by weight, an improvement of the smoothness of the electrodeposited coating film and the restraint of the pinhole and cratering characteristic cannot be achieved. However, if the amount of these fatty acid ester resins used exceeds 3% by weight, mechanical properties of the dried coating film such as pencil hardness is deteriorated. Therefore, the amount of the fatty acid ester resin used is preferably in the range of about 1–3% by weight, and more preferably about 1.5–2.5% by weight.

The cationic electrodeposition composition according to the present invention may contain pigments, solvents and additives such as a surface improving additive, a surfactant, a thickening agent, a curing catalyst, etc. As the curing catalyst, a metallic salt of organic acids such as cobalt acetate, chrome octoate, chrome naphthenate, lead acetate and dibutyl tin oxide may be usually used.

The method of preparing the cationic electrodeposition coating composition according to the present invention will be described in detail below.

First, a cationic electrodeposition resin is prepared in the presence of an organic solvent having a low boiling point of about 140° C. or less from (a) about 40–60% by weight of a cationic electrodeposition synthetic resin produced by an epoxy-amino addition reaction (b) about 5–10% by weight of an acrylic cationic electrodeposition resin having an amino group (c) about 1–3% by weight of a fatty acid ester resin synthesized by an esterification reaction of styrene-allylalcohol copolymer and fatty acid and (d) about 30–50% by weight of polyurethane cross-linking agent produced from a mixture of blocked polymethylene polyphenyl polyisocyanate and blocked isophorone diisocyanate.

As the organic solvents having the low boiling point, methyl isobutyl ketone, xylene, toluene, methyl ethyl ketone, etc. can be illustrated.

The cationic electrodeposition synthetic resin obtained by an epoxy-amino addition reaction may be manufactured by using an epoxy resin, polycaprolactonediol, bisphenol A, and benzyl dimethyl amine.

Thereafter, about 35–45% by weight of thus prepared cationic electrodeposition resin, about 55–65 parts by weight of deionized water, about 0.3–1.5 parts by weight of an acid for neutralization, about 1–5 parts by weight of a reaction product of manganese phosphate and an acid diluted in an deionized water to 10%, and about 0.5–1 parts by weight of a cationic surfactant, are mixed to prepare an aqueous dispersion. The aqueous dispersion is extracted under reduced pressure to remove the organic solvents having the low boiling point. In the following, the aqueous dispersion is filtered to prepare the cationic electrodeposition coating composition.

During the process of using the acid for neutralization, the degree of neutralization of the existing amino group is preferably in the range of about 20–100%, and more preferably is about 40–70%. According to a suitable neutralization method, an acid for neutralization such as formic acid, acetic acid, lactic acid and phosphoric acid, a surfactant, deionized water, etc., are added and dispersed into water by a high-speed stirring so that an excellent resin of an aqueous dispersion may be obtained.

Successively, a solvent stripping of the organic solvent having the low boiling point is performed at about 40–80° C. and at about 30–90 mmHg, and more preferably is performed under a reduced pressure of about 50–70 mmHg. Then, organic solvents having a high boiling point over 140° C., which has been included in the preparation of the cationic electrodeposition synthetic resin obtained by an epoxy-amino addition reaction, the acrylic cationic electrodeposition resin having an amino group, and the fatty acid ester resin synthesized by an esterification reaction of styrene-allylalcohol copolymer and fatty acid, remains. Meanwhile, organic solvents having the low boiling point such as methyl isobutyl ketone, xylene, toluene, methyl ethyl ketone, etc., are removed.

After implementing the solvent stripping process for making the solid content of the aqueous dispersion of the cationic electrodeposition resin being about 20–60% by weight, and more preferably about 30–40% by weight, the aqueous dispersion is filtered through diatomaceous earth in such a manner that an improved cationic electrodeposition coating composition can be obtained. The average particle size of the improved cationic electrodeposition coating composition is less than 60 nm and the organic solvent content is minimized.

The method of preparing the first component of the cationic electrodeposition coating composition, the cationic electrodeposition resin dispersion has been described above. Hereinbelow, a method of preparing the second component, a pigment paste composition will be described.

First, a pigment grinding vehicle for the cationic electrodeposition coating composition is prepared from about 25–35% by weight of polyglycidyl ether of bisphenol A, about 5–12% by weight of propyleneglycol monomethyl ether acetate, about 8–15% by weight of partially blocked isocyanate cross-linking agent, about 25–40% by weight of ethylene glycol monobutyl ether, about 10–20% by weight of organic tertiary amino acid salt and about 0–5% by weight of deionized water.

If the amount of the polyglycidyl ether of bisphenol A used is less than about 25% by weight, properties such as corrosion-resistance, water resistance, etc. are deteriorated, and if the amount of the polyglycidyl ether of bisphenol A used exceeds 35% by weight, mechanical properties of the dried coating layer such as hardness is diminished. Therefore, the amount of the polyglycidyl ether of bisphenol A used is preferably in the range of about 25–35% by weight, and more preferably about 27–32% by weight.

If the amount of the propyleneglycol monomethyl ether acetate used is less than 5% by weight, the process of melting the polyglycidyl ether resin of bisphenol A is poorly performed. If the amount of the propyleneglycol monomethyl ether acetate used exceeds 12 percent by weight, the stability of the paint manufactured with the pigment grinding vehicle is deteriorated. Therefore, the amount of the propyleneglycol monomethyl ether acetate used is preferably about 5–12% by weight, and more preferably about 7–10% by weight.

If the amount of the partially blocked isocyanate cross-linking agent used is less than 8% by weight, the hardness of the coating layer is lessened. If the amount of the partially blocked isocyanate cross-linking agent used exceeds 15% by weight, the mechanical property of the coating layer is lowered due to the increase of the hardness of the coating layer. Therefore, the amount of the partially blocked isocyanate cross-linking agent used is preferably in the range of about 8–15% by weight, and more preferably about 10–13% by weight.

If the amount of ethylene glycol monobutyl ether used is less than 25% by weight, the stability of the electrodeposition paint is poor, and if the amount of the ethylene glycol monobutyl ether used exceeds 40% by weight, the organic solvent content is increased. So, the amount of the ethylene glycol monobutyl ether used is preferably in the range of about 25–40% by weight, and more preferably about 30–35% by weight.

If the amount of the organic tertiary amino acid salt used is less than 10% by weight, the water-miscibility is insufficient. And if the amount of the organic tertiary amino acid salt used exceeds 20% by weight, the property of water resistance is poor. So, the amount of the organic tertiary amino acid salt used is preferably in the range of about 10–20% by weight, and more preferably about 13–16% by weight.

At this time, if the polyglycidyl ether of bisphenol A has an epoxy equivalent weight less than about 900, chemical properties of the coating layer such as water resistance, corrosion-resistance, etc., are poor. Therefore, the epoxy equivalent weight of the polyglycidyl ether of bisphenol A used is preferably about 900–1200 (or 1400–2800 by weight-average molecular weight).

The pigment paste composition includes the pigment grinding vehicle prepared by the above-described method, pigment ingredients such as carbon black or titanium dioxide, a catalyst such as dibutyl tin oxide and an anticorrosive pigment for improving the corrosion-resistance.

In the pigment paste composition, the amount of the pigment grinding vehicle used is in the range of about 15–30% by weight and preferably, about 17–25% by weight. If the amount of the pigment grinding vehicle is less than 15% by weight, a viscosity increases during storing, thereby weakening a storage stability. If the amount of the pigment vehicle exceeds 30% by weight, the storage stability is increased. However, some properties such as water-resistance, chemical-resistance, etc. of a dried film of the cationic electrodeposition coating composition are deteriorated.

In order to improve the corrosion-resistance of the dried film, an anticorrosive pigment such as a bismuth compound containing bismuth hydroxide, bismuth trioxide, bismuth oxide, etc., aluminum tri-phosphate hydrate, magnesium aluminum hydroxide carbonate hydrate, etc. can be included in the pigment paste composition. The amount of the anticorrosive pigment is in the range of about 2–6% by weight, and more preferably about 3–5% by weight. If the amount of the anticorrosive pigment is less than 2% by weight, the corrosion-resistance of the dried film of the cationic electrodeposition coating composition is deteriorated and if the amount exceeds 6% by weight, the viscosity of the pigment increases to generate a coagulating phenomenon during storing.

Further, a tin compound such as dibutyl tin oxide can be included in the pigment paste composition as a curing catalyst. The amount used of the tin compound is in the range of about 0.7–2.3% by weight, and more preferably about 1–2% by weight. If the amount of the tin compound is less than 0.7% by weight, a curing characteristic is weakened and so mechanical properties and chemical properties are weakened after drying the cationic electrodeposition coating composition. If the amount of the tin compound exceeds 2.3% by weight, the crosslinking density increases after the drying and the chemical properties are improved, however, the mechanical properties such as impact resistance and flexibility are deteriorated.

In addition, the ratio of the solid content of the pigment/pigment grinding vehicle in the pigment paste composition is in the range of about 1/0.20–1/0.45, and more preferably in the range of about 1/0.25–1/0.35. If the ratio of the solid content of the pigment/pigment grinding vehicle of the pigment paste composition is less than 1/0.20, the mechanical properties and the chemical properties of the dried film of the cationic electrodeposition coating composition are deteriorated, and if exceeds 1/0.45, the stability of the pigment paste composition is deteriorated to generate a coagulating phenomenon.

Hereinafter, the present invention will be explained in more detail referring to the preferred embodiments. However, the present invention is not limited to the following embodiments. The parts are by weight and the percents are by weight too.

Synthetic Example 1

A cationic acrylic copolymer resin was manufactured using the following mixture illustrated in Table 1.

TABLE 1

| Ingredients | weight parts |
|---|---|
| ethylene glycol monobutyl ether | 34.7 |
| butyl acrylate | 6.2 |
| styrene | 29.3 |
| (N,N-dimethyl)aminoethyl methacrylate | 5.9 |
| 2-hydroxyethyl acrylate | 11.8 |
| methyl methacrylate | 1.8 |
| isobornyl methacrylate | 4.1 |
| ethylene glycol monobutyl ether | 0.9 |
| azo-bisisobutylronitrile | 0.7 |
| ethylene glycol monobutyl ether | 1.9 |
| azo-bisisobutyronitrile | 0.7 |

34.7 parts of ethylene glycol monobutyl ether was introduced into a flask and held under nitrogen atmosphere at 110° C. Then, a mixture of 6.2 parts of butyl acrylate, 29.3 parts of styrene, 5.9 parts of (N, N-dimethyl)aminoethyl methacrylate, 11.8 parts of 2-hydroxyethyl acrylate, 1.8 parts of methyl methacrylate and 4.1 parts of isobornyl methacrylate at 115° C., was dropped over four hours. Also, a mixture of 0.7 parts of azo-bisisobutyronitrile and 1.9 parts of ethylene glycol monobutyl ether was dropwisely added to the resultant through a funnel over an hour. After the addition, the mixture was held for three hours to obtain a cationic acrylic copolymer whose amine value was 30–40 and solid content was 60 percent.

Synthetic Example 2

A fatty acid ester resin synthesized by an esterificatioh of a styrene-allylalcohol copolymer and fatty acid was manufactured from the following mixture illustrated in Table 2.

TABLE 2

| Ingredients | weight parts |
|---|---|
| coconut fatty acid | 9.9 |
| styrene-allylalcohol copolymer | 60.3 |
| xylene | 1.9 |
| ethylene glycol monobutyl ether | 27.9 |

After 9.9 parts of palm oil (fatty acid) and 60.3 parts of styrene-allylalcohol copolymer were introduced into a flask and heated to 140° C. to be melted. The resultant mixture was heated to 220° C. and held at this temperature to obtain a fatty acid ester resin synthesized by an esterification reaction of styrene-allylalcohol copolymer and fatty acid. The acid value of the fatty acid ester resin was less than 4 and the solid content thereof was 70.

Synthetic Example 3

A reaction product of manganese phosphate and phosphoric acid diluted to a concentration of 10% in deionized water was prepared by utilizing the compounds illustrated in Table 3.

TABLE 3

| ingredients | weight parts |
|---|---|
| manganese phosphate | 4.08 |
| phosphoric acid | 1.0 |
| deionized water | 35.72 |

4.08 parts of manganese phosphate and 35.72 parts of deionized water were added into a flask and heated to 60° C. After stirring for one hour, 1.0 parts of is phosphoric acid was added at 40° C. and thus obtained product was stood for 30 minutes.

EXAMPLE 1

From the mixture having the following ingredients illustrated in Table 4, a cationic electrodeposition resin was manufactured.

TABLE 4

| ingredients | weight parts |
|---|---|
| EPIKOTE 828CD[*1] | 27.1 |
| PLACCEL 205[*2] | 9.7 |
| bisphenol A | 7.9 |
| methyl isobutyl ketone | 2.4 |
| benzyl dimethyl amine | 0.15 |

TABLE 4-continued

| ingredients | weight parts |
| --- | --- |
| cationic resin containing (N,N-dimethyl)aminoethyl methacrylate (synthetic example 1) | 9.0 |
| fatty acid ester resin synthesized by an esterification of styrene-allylalcohol copolymer and fatty acid (synthetic example 2) | 1.6 |
| blocked polyisocyanate cross-linking agent*[3] | 20.2 |
| blocked polyisocyanate cross-linking agent*[4] | 20.2 |
| diketimine derived from diethylene triamine and methyl isobutyl ketone (73% of solid content in methyl isobutyl ketone) | 3.0 |
| N-methylethanolamine | 2.6 |

*[1]EPIKOTE 828CD is an epoxy resin manufactured by the reaction of epichlorohydrin and bisphenol A, which may be purchased from Kumho P&B Co., Ltd. in Korea. The epoxy equivalent weight thereof was approximately 188.
*[2]PLACCEL 205 is a polycaprolactondiol which may be purchased from DICEL Corp. in Japan.
*[3]The blocked polyisocyanate cross-linking agent was manufactured from the mixture having the following ingredients. A mixture containing polymethylene-polyphenyl isocyanate and diphenyl methyl-4,4-diisocyanate (Polymeric MDI (PAPI-135K) which may be purchased from HD POLYURETHANE Co., in Korea) was half blocked with diethylene glycolmonobutyl ether. Then, the resulting product was reacted with trimethylolpropane at a molar ratio of 3:1 to form the polyurethane cross-linking agent.
*[4]The blocked polyurethane crosslinking agent is polyurethane cross-linking agent prepared by half blocking isophorone diisocyanate (purchased from DEGUSA-Huls Co.) and then reacting thus obtained product with trimethylol propane in a molar ratio of 3:1.

An aqueous dispersion of the cationic electrodeposition resin was prepared from the mixture of the following ingredients illustrated in Table 5.

TABLE 5

| ingredients | weight parts |
| --- | --- |
| cationic electrodeposition resin according to the present example | 39.25 |
| acetic acid | 0.45 |
| reaction product of 10% manganese phosphate and phosphoric acid | 3.5 |
| cationic surfactant*[1] | 0.53 |
| deionized water | 56.27 |

*[1]The cationic surfactant is a commercially available XS-139, which may be purchased from Air Products and Chemical Inc.

1-(a) preparation of a cationic electrodeposition resin 27.1 parts of EPIKOTE 828CD, 9.7 parts of PLACCEL 205, 7.9 parts of bisphenol A and 2.4 parts of methyl isobutyl ketone were introduced into a reactor. The mixture was then heated to 140° C. under a nitrogen atmosphere. Then, 0.04 parts of benzyl dimethyl amine was added to the reaction mixture, which was heated to 210° C. and was reacted at a reflux temperature for thirty minutes to remove water. The resultant mixture was cooled to 160° C. and held in that state for one and half hours. Then, the resulting mixture was cooled to 145° C. and 0.11 parts of benzyl dimethyl amine was added to the resulting product, which was reacted at 145° C. for approximately two and half hours to prepare the cationic electrodeposition synthetic resin obtained by an epoxy-amino addition reaction. To the cationic electrodeposition synthetic resin obtained by an epoxy-amino addition reaction, 9.0 parts of a cationic resin having (N,N-dimethyl) aminoethyl methacrylate, 1.6 parts of a fatty acid ester resin synthesized by an ester reaction of styrene-allylalcohol copolymer and fatty acid and 40.5 parts of a blocked isocyanate cross-linking agent were sequentially and slowly added at the same temperature. Next, 3.0 parts of diketimine (73% of solid content in methyl isobutyl ketone) derived from diethylene triamine and methyl isobutyl ketone and 2.6 parts of N-methyl ethanol amine were added to the resultant at 100–110° C. , which was held at 125° C. for an hour to obtain the cationic electrodeposition resin.

1-(b) preparation of an aqueous dispersion of the cationic electrodeposition resin 56.27 parts of deionized water, 0.45 parts of acetic acid, 3.5 parts of a reaction product of 10% manganese phosphate with phosphoric acid and 0.53 parts of cationic surfactant, XS-139, were successively introduced into a reactor and homogenized. Then, 39.25 parts of cationic electrodeposition resin was slowly added and was stirred at a high speed in order to disperse into water. Meanwhile, a solvent stripping process was performed at 60° C. and under a reduced pressure of approximately 60 mmHg in order to remove a low boiling point organic solvent. Then, the water-dispersed resin was filtered through diatomaceous earth in such a manner that a water-dispersed solution of the cationic electrodeposition resin whose solid content was 36% and average particle size was less than 60 nm can be obtained. The organic solvent content in the aqueous dispersion of the obtained cationic electrodeposition resin was approximately 0.3% or less.

1-(c) preparation of a pigment grinding vehicle

A pigment grinding vehicle was prepared by reacting polyglycidyl ether of bisphenol A, a partially blocked isocyanate cross-linking agent and organic tertiary aminate as illustrated in Table 6 below.

TABLE 6

| ingredients | weight parts |
| --- | --- |
| EPIKOTE 3004CD*[1] | 29.0 |
| propylene glycol monomethyl ether acetate | 10.0 |
| partially blocked isocyanate cross-linking agent*[2] | 12.0 |
| ethylene glycol monobutyl ether | 33.0 |
| organic tertiary aminate*[3] | 14.0 |
| deionized water | 2.0 |

*[1]Polyglycidyl ether of bisphenol A (epoxy equivalent weight 900–1200) which may be purchased from Kumho P&B Co., Ltd. in Korea, was used.
*[2]The used partially blocked isocyanate cross-linking agent was prepared by reacting 54.3 parts of 2,4-tolueneisocyanate and 40.7 parts of 2-ethyl hexanol at less than 40° C. for three hours, adding 5.0 parts of methyl isobutyl ketone and diluting.
*[3]The used organic tertiary aminate was manufactured as follows. 15.5 parts of dimethyl ethanol amine and 56.7 parts of a partially blocked isocyanate cross-linking agent were reacted at a room temperature for two hours. The disappearance of NCO peak could be confirmed at 80° C. Then, 17.4 parts of lactic acid (purity 88%), 3.5parts of deionized water and 7.0 parts of ethylene glycol monobutyl ether were added and reacted at 60° C. for an hour to obtain the organic tertiary aminate.

29.0 parts of EPIKOTE 3004CD and 10.0 parts of prolylene glycol monomethyl ether acetate were added to a reactor and heated to 110–120° C. so as to melt homogeneously. To the resulting product was added 12.0 parts of a partially blocked isocyanate cross-linking agent, and the resulting product was held for an hour. Next, 33.0 parts of ethylene glycol monobutyl ether was added to the resulting product, which was heated to 80–90° C. . Thereafter, 14.0 parts of organic tertiary aminate and 2.0 parts of deionized water were added to the resulting product, which was held until the acid value became approximately 0.8 so the pigment grinding vehicle was obtained. At this time, the epoxy equivalent weight of the polyglycidyl ether of bisphenol A was 900–1200.

1-(d) preparation of the pigment paste composition

A mixture of 0.6 parts of carbon black, 22.05 parts of titanium dioxide, 4.51 parts of bismuth trioxide, 45 parts of deionized water, 1.7 parts of dibutyl tin oxide, 16.77 parts of aluminum silicate and 25 parts of pigment grinding vehicle was ground in a bead mill to have a particle size of less than 15 μm, thereby obtaining a dispersed product of a pigment paste composition. At this time, the solid content of the pigment paste composition was 50% and the ratio of the solid content of pigment/pigment grinding vehicle was 1/0.27.

110 parts of thus obtained pigment paste composition, 403 parts of an aqueous dispersion of the cationic electrodeposition resin and 392 parts of deionized water were homogeneously stirred to obtain a diluted product of a cationic electrodeposition coating composition.

EXAMPLE 2

From the mixture having the following ingredients illustrated in Table 7, an aqueous dispersion of a cationic electrodeposition resin was manufactured.

TABLE 7

| ingredients | weight parts |
|---|---|
| EPIKOTE 829*[1] | 27.1 |
| bisphenol A | 17.6 |
| xylene | 2.4 |
| benzyl dimethyl amine | 0.15 |
| cationic resin containing (N,N-dimethyl)aminoethyl methacrylate (synthetic example 1) | 9.0 |
| fatty acid ester resin synthesized by an esterification of styrene-allylalcohol copolymer and fatty acid (synthetic example 2) | 1.6 |
| blocked polyisocyanate cross-linking agent*[2] | 24.3 |
| blocked polyisocyanate cross-linking agent*[3] | 16.2 |
| diketimine derived from diethylene triamine and methyl isobutyl ketone (73% of solid content in methyl isobutyl ketone) | 3.0 |
| N-methyl ethanolamine | 2.6 |

*[1]EPIKOTE 829 is an epoxy resin manufactured by the reaction of epichlorohydrin and bisphenol A, which may be purchased from Kumho P&B Co., Ltd. in Korea. The epoxy equivalent weight thereof was approximately 188.
*[2]The blocked polyisocyanate cross-linking agent was manufactured from the mixture having the following ingredients. A mixture containing polymethylene-polyphenyl isocyanate and diphenylmethyl-4, 4-diisocyanate (Polymeric MDI (PAPI-135K) which may be purchased from HD POLYURETHANE Co., in Korea.)was half blocked with diethylene glycol monobutyl ether. Then, the resulting product was reacted with trimethylolpropane at a molar ratio of 3:1 to form the polyurethane cross-linking agent.
*[3]The blocked polyurethane cross-linking agent is polyurethane cross-linking agent prepared by half blocking isophorone diisocyanate (purchased from DEGUSA-Huls Co.) and then reacting thus obtained product with trimethylol propane in a molar ratio of 3:1.

An aqueous dispersion of the cationic efectrodeposition resin was prepared from the mixture of the following ingredients illustrated in Table 8.

TABLE 8

| ingredients | weight parts |
|---|---|
| cationic electrodeposition resin according to the present example | 39.00 |
| lactic acid | 1.09 |
| reaction product of 10% manganese phosphate and phosphoric acid (synthetic example 3) | 3.5 |
| cationic surfactant*[1] | 0.53 |
| deionized water | 55.89 |

*[1]The cationic surfactant is a commercially available XS-139, which may be purchased from Air Products and Chemical Inc.

2-(a) preparation of a cationic electrodeposition resin 27.1 parts of EPIKOTE 829, 17.6 parts of bisphenol A and 2.4 parts of xylene were introduced into a reactor. The mixture was then heated to 140° C. under a nitrogen atmosphere. Then, 0.04 parts of benzyl dimethyl amine was added to the reaction mixture, which was heated to 210° C. and was reacted at a reflux temperature for thirty minutes to remove water. The resultant mixture was cooled to 160° C. and held in that state for one and half hours. Then, the resulting mixture was cooled to 145° C. and 0.11 parts of benzyl dimethyl amine was added to the resulting product, which was reacted at 145° C. for approximately two and half hours to prepare the cationic electrodeposition synthetic resin obtained by an epoxy-amino addition reaction. To the cationic electrodeposition synthetic resin obtained by an epoxy-amino addition reaction, 9.0 parts of a cationic resin having (N,N-dimethyl)aminoethyl methacrylate, 1.6 parts of a fatty acid ester resin synthesized by an esterification of styrene-allylalcohol copolymer and fatty acid and 40.5 parts of a blocked isocyanate cross-linking agent were sequentially and slowly added at the same temperature. Next, 3.0 parts of diketimine (73% of solid content in methyl isobutyl ketone) derived from diethylene triamine and methyl isobutyl ketone and 2.6 parts of N-methyl ethanol amine were added to the resultant at 100–110° C. , which was held at 125° C. for an hour to obtain the cationic electrodeposition resin. Then, 24.3 parts of blocked isocyanate cross-linking agent and 16.2 parts of blocked isocyanate cross-linking agent were subsequently and slowly added at 90° C. to prepare the low temperature curable cationic electrodeposition resin.

2-(b) preparation of an aqueous dispersion of the cationic electrodeposition resin 55.89 parts of deionized water, 1.09 parts of 88% lactic acid, 0.53 parts of cationic surfactant, XS-139 and 3.5 parts of a reaction product of 10% manganese phosphate with phosphoric acid, were successively introduced into a reactor and homogenized. Then, 39.0 parts of cationic electrodeposition resin was slowly added and was stirred at a high speed in order to disperse into water. Meanwhile, a solvent stripping process was performed at 60° C. and under a reduced pressure of approximately 60 mmHg in order to remove a low boiling point organic solvent. Then, the water-dispersed resin was filtered through diatomaceous earth in such a manner that an aqueous dispersion of the cationic electrodeposition resin whose solid content was 36% and average particle size was less than 60 nm can be obtained. The organic solvent content in the aqueous dispersion of the obtained cationic electrodeposition resin was approximately 0.3% or less.

2-(c) preparation of a pigment grinding vehicle

A pigment grinding vehicle was prepared by reacting polyglycidyl ether of bisphenol A, a partially blocked isocyanate cross-linking agent and organic tertiary aminate as illustrated in Table 9 below.

TABLE 9

| ingredients | weight parts |
|---|---|
| EPIKOTE 3004CD*[1] | 29.0 |
| propylene glycol monomethyl ether acetate | 10.0 |
| partially blocked isocyanate cross-linking agent*[2] | 12.0 |
| ethylene glycol monobutyl ether | 33.0 |
| organic tertiary aminate*[3] | 14.0 |
| deionized water | 2.0 |

*[1]Polyglycidylether of bisphenol A (epoxy equivalent weight 900–1200) which may be purchased from Kumho P&B Co., Ltd. in Korea, was used.

TABLE 9-continued

| ingredients | weight parts |
|---|---|

*²The used partially blocked isocyanate cross-linking agent was prepared by reacting 54.3 parts of 2,4-tolueneisocyanate and 40.7 parts of 2-ethyl hexanol at less than 40° C. for three hours, adding 5.0 parts of methyl isobutyl ketone and diluting.
*³The used organic tertiary aminate was manufactured as follows. 15.5 parts of dimethyl ethanol amine and 56.7 parts of a partially blocked isocyanate cross-linking agent were reacted at room temperature for two hours. The disappearance of NCO peak could be confirmed at 80° C. Then, 17.4 parts of lactic acid (88%), 3.5 parts of deionized water and 7.0 parts of ethylene glycol monobutyl ether were added and reacted at 60° C. for an hour to obtain the organic tertiary aminate.

29.0 parts of EPIKOTE 3004CD and 10.0 parts of propylene glycol monomethyl ether acetate were added to a reactor and heated to 110–120° C. so as to melt homogeneously. To the resulting product was added 12.0 parts of a partially blocked isocyanate cross-linking agent, and the resulting product was held for an hour. Next, 33.0 parts of ethylene glycol monobutyl ether was added to the resulting product, which was heated to 80–90° C. Thereafter, 14.0 parts of organic tertiary aminate and 2.0 parts of deionized water were added to the resulting product, which was held until the acid value became approximately 1 so the pigment grinding vehicle having a good dispersibility and storage stability was obtained.

2-(d) preparation of the pigment paste composition

A mixture of 0.6 parts of carbon black, 22.05 parts of titanium dioxide, 4.51 parts of bismuth trioxide, 45 parts of ion exchanged water, 1.7 parts of dibutyl tin oxide, 16.77 parts of aluminum silicate and 25 parts of pigment grinding vehicle was ground in a bead mill to have a particle size of less than 15 μm, thereby obtaining a dispersed product of a pigment paste composition. At this time, the solid content of the pigment paste composition was 50% and the ratio of the solid content of pigment/pigment grinding vehicle was 1/0.27.

110 parts of thus obtained pigment paste composition, 403 parts of an aqueous dispersion of the cationic electrodeposition resin and 392 parts of deionized water were homogeneously stirred to obtain a diluted product of the cationic electrodeposition coating composition.

Comparative Example 1

A dispersed solution of a cationic electrodeposition resin the same as that of Example 1 was prepared using the resin synthesized by the same method as mentioned in Example 1, except that a cationic resin having (N,N-dimethyl) aminoethyl methacrylate (Synthetic Example 1), a fatty acid ester resin synthesized by an ester reaction of styrene-allylalcohol copolymer and fatty acid (Synthetic Example 2) and a reaction product of 10% manganese phosphate and phosphoric acid (Synthetic Example 3) were not added to the cationic electrodeposition resin composition of Example 1-(a).

In addition, a pigment paste composition was prepared by the same method as mentioned in Example 1-(d), except that bismuth trioxide was not added and 0.5 parts of dibutyl tin oxide was added. Then, a cationic electrodeposition coating composition was prepared by the same method as mentioned in Example 1.

Comparative Example 2

A dispersed solution of a cationic electrodeposition resin the same as that of Example 2 was prepared using the resin synthesized by the same method as mentioned in Example 2, except that a cationic resin having (N,N-dimethyl) aminoethyl methacrylate (Synthetic Example 1) and a fatty acid ester resin synthesized by an ester reaction of styrene-allylalcohol copolymer and fatty acid (Synthetic Example 2) were not added to the cationic electrodeposition resin composition of Example 2-(a).

In addition, a pigment paste composition was prepared by the same method as mentioned in Example 1-(d), except that bismuth trioxide was not added and 0.5 parts of dibutyl tin oxide was added. Then, a cationic electrodeposition coating composition was prepared by the same method as mentioned in Example 2.

By using the electrodeposition coating compositions obtained from Examples 1 and 2 and Comparative Examples 1 and 2, an electrodeposition coating was performed at 28° C. and at a voltage of 200V for three minutes, and at a curing temperature of 165° C. for twenty minutes. The properties of the obtained film having the thickness of 20 μm were examined. The testing results on the film are illustrated in Table 10.

TABLE 10

| | Example 1 | Example 2 | Comparative Example 1 | Comparative Example 2 |
|---|---|---|---|---|
| appearance | ◉ | ◉ | ◉ | ◉ |
| baking temperature | 150° C. | 150° C. | 150° C. | 150° C. |
| gloss (60° glossmeter) | 68 | 67 | 73 | 77 |
| pencil hardness (Mitsubishiuni) | 2H | 2H | HB | HB |
| adhesion*¹ | ◉ | ◉ | ◉ | ◉ |
| impact-resistance*⁷ (1/2" 500 g × 50 cm) | OK | OK | NG | NG |
| flexible-resistance*⁸ (Mandrel Conical) | OK | OK | NG | NG |
| corrosion resistance 1*² | <0.5 mm | <0.5 mm | >5 mm | >5 mm |
| corrosion resistance 2*³ | <0.2 mm | <0.3 mm | >5 mm | >5 mm |
| water-resistance*⁴ | ◉ | ◉ | Δ | Δ |
| solvent-resistance*⁵ | ◉ | ◉ | Δ | Δ |
| yellowing resistance*⁶ | ◉ | ◉ | Δ | Δ |
| weather-resistance*⁹ | ◉ | ◉ | Δ | Δ |

*Note: ◉; excellent, ○; good, Δ; common, NG; not good
*¹cross-cut: A taping test was performed by cross-cutting the film in a size of 1 mm × 1 mm within a size of 1 cm × 1 cm.
*²corrosion resistance 1: After spraying 5% NaCl solution at 35° C. over a thousand hours and allowing it to stand for twenty-four hours, a taping test was performed.
*³corrosion resistance 2: After immersing the film in 5% NaCl solution at 50° C. for two-hundred forty hours, a taping test was performed.
*⁴water-resistance: After immersing the film in hot-water of 50° C. for two-hundred forty hours, the external appearance of the coating layer was observed.
*⁵solvent-resistance: After reciprocating rubbing the film twenty times with methyl isobutyl ketone solvent, the presence of any abnormality in the coating layer was observed.
*⁶yellowing resistance: After coating a small amount of white enamel paint on the electrodeposition coated test plate, curing at 150° C. for more than forty minutes and drying, the degree of yellowing resistance in the top coating was tested.
*⁷impact-resistance: The test was executed five times by means of an impact-resistance tester manufactured from Dupont Co. wherein a coating layer which was not destroyed more than four times was regarded as OK.
*⁸flexible-resistance: The test was executed five times by means of a Mandrel Conical flexible-resistance tester wherein a coating layer which did not crack for more than four times was regarded as OK.
*⁹weathering resistance: Gloss and color difference were tested by means of a Weather-O-Meter (W.O.M) for two hundred hours.

As shown in Table 10, the coating layer formed by using the cationic electrodeposition coating composition of Examples 1 and 2 using the cationic resin having (N,N-dimethyl)aminoethyl metacrylate (Synthetic Example 1), the fatty acid ester resin synthesized by an esterification of styrene-allylalcohol copolymer and fatty acid (Synthetic Example 2) and manganese phosphate (Synthetic Example 3), along with a pigment paste composition including bismuth compound instead of lead compound, is curable at a low temperature and has an excellent corrosion resistance, appearance, yellowing resistance, weather resistance, mechanical properties, etc.

Meanwhile the coating layer formed by using the cationic electrodeposition coating compositions of Comparative Examples 1 and 2 without employing the cationic resin and the fatty acid ester resin, has a good appearance but not as good as those of Examples 1 and 2, and has an inferior level of corrosion resistance, yellowing resistance and weather resistance as those of Examples 1 and 2. Moreover, from the aspect of pencil hardness, the coating layer formed by using the cationic electrodeposition coating composition of Examples 1 and 2 is better than that of Comparative Examples 1 and 2.

As described above, an aqueous dispersion of the cationic electrodeposition resin in the cationic electrodeposition coating composition of the present invention includes a metal salt for improving a corrosion resistance and a minimized amount of organic solvents less than 0.3%. A dried film formed by electrodepositing a composition using a bismuth compound instead of a lead compound in a pigment paste composition, has a good chemical properties such as a corrosion-resistance and an improved physical properties such as an external appearance, yellowing resistance, weather resistance, etc. while keeping the remaining excellent characteristics as it stands.

Even when a cationic electrodeposition coating composition is prepared by employing the aqueous dispersion of the cationic electrodeposition resin of the present invention along with the conventional pigment paste composition, the corrosion resistance is improved and the amount of the organic solvent used can be reduced. And even when a cationic electrodeposition coating composition is prepared by employing the pigment paste composition of the present invention along with the conventional aqueous dispersion of the cationic electrodeposition resin, a lead-free film can be formed and film characteristics such as the corrosion resistance, chemical resistance, etc. can be improved.

Accordingly, even though excellent effects can be obtained when both of the aqueous dispersion of the cationic electrodeposition resin and the pigment paste composition are used for the preparation of the cationic electrodeposition coating composition, an inclusion of one of the two compositions results in an improved effect. Therefore, the coating composition including one of the two compositions is included in the present invention.

While the present invention is described in detail referring to the attached embodiments, various modifications, alternate constructions and equivalents may be employed without departing from the true spirit and scope of the present invention.

What is claimed is:

1. A resin dispersion of a cationic electrodeposition including an aqueous dispersion prepared by mixing:

about 35–45 parts by weight of a cationic electrodeposition resin prepared in the presence of an organic solvent from (a) about 40–60% by weight of a cationic electrodeposition synthetic resin produced by an epoxy-amino addition reaction (b) about 5–10% by weight of an acrylic cationic electrodeposition resin having an amino group (c) about 1–3% by weight of a fatty acid ester resin synthesized by an esterification reaction of styrene-allylalcohol copolymer and fatty acid and (d) about 30–50% by weight of polyurethane cross-linking agent produced from a mixture of blocked polymethylene polyphenyl polyisocyanate and blocked isophorone diisocyanate;

about 55–65 parts by weight of deionized water;

about 0.3–1.5 parts by weight of an acid for a neutralization;

about 1–5 parts by weight of a reaction product of manganese phosphate and an acid diluted to a concentration of 10% in deionized water; and about 0.5–1 parts by weight of a cationic surfactant.

2. A resin dispersion of a cationic electrodeposition as claimed in claim 1, wherein said acrylic cationic electrodeposition resin is a copolymerized resin from at least one selected from the group consisting of butyl acrylate, methyl acrylate, hydroxyethyl acrylate, styrene, methyl methacrylate and (N,N-dimethyl)aminoethyl methacrylate.

3. A resin dispersion of a cationic electrodeposition as claimed in claim 1, wherein said blocked polymehtylene polyphenyl polyisocyanate and said blocked isophorone diisocyanate is blocked by at least one blocking agent selected from the group consisting of methyl ethyl ketoxime, dimethyl pyrazole, diethyl malonate, ethylene glycol monobutyl ether and diethylene glycol monobutyl ether.

4. A resin dispersion of a cationic electrodeposition as claimed in claim 1, wherein a solid content in said resin dispersion id about 30–40% by weight and a mean size of particles contained in said resin dispersion is about 60 nm or less.

5. A resin dispersion of a cationic electrodeposition as claimed in claim 1, wherein an amount of organic solvents in said resin dispersion is 0.5% by weight or less.

6. A method of preparing a resin dispersion of a cationic electrodeposition comprising the steps of:

preparing a cationic electrodeposition resin in the presence of an organic solvent from (a) about 40–60% by weight of a cationic electrodeposition synthetic resin produced by an epoxy-amino addition reaction.(b) about 5–10% by weight of an acrylic cationic electrodeposition resin having an amino group (c) about 1–3% by weight of a fatty acid ester resin synthesized by an esterification reaction of styrene-allylalcohol copolymer and fatty acid and (d) about 30–50% by weight of polyurethane cross-linking agent produced from a mixture of blocked polymethylene polyphenyl polyisocyanate and blocked isophorone diisocyanate;

preparing an aqueous dispersion by mixing about 35–45 parts by weight of said cationic electrodeposition resin, about 55–65 parts by weight of deionized water, about 0.3–1.5 parts by weight of an acid for a neutralization, about 1–5 parts by weight of a reaction product of manganese phosphate and an acid diluted to a concentration of 10% in deionized water and about 0.5–1 parts by weight of a cationic surfactant; and removing organic solvents having a low boiling point from said aqueous dispersion by extracting and then filtering.

7. A method of preparing a resin dispersion of a cationic electrodeposition as claimed in claim 6, wherein said acid reacting with said manganese phosphate is at least one selected from the group consisting of phosphoric acid, acetic acid, formic acid, lactic acid and sulfamic acid.

8. A cationic electrodeposition coating composition comprising an aqueous dispersion and a pigment paste composition, said aqueous dispersion being prepared by mixing:

about 35–45 parts by weight of a cationic electrodeposition resin prepared in the presence of an organic solvent from (a) about 40–60% by weight of a cationic electrodeposition synthetic resin produced by an epoxy-amino addition reaction (b) about 5–10% by weight of an acrylic cationic electrodeposition resin having an amino group (c) about 1–3% by weight of a fatty acid ester resin synthesized by an esterification reaction of styrene-allylalcohol copolymer and fatty acid and (d) about 30–50% by weight of polyurethane cross-linking agent produced from a mixture of blocked polymethylene polyphenyl polyisocyanate and blocked isophorone diisocyanate;

about 55–65 parts by weight of deionized water;

about 0.3–1.5 parts by weight of an acid for a neutralization;

about 1–5 parts by weight of a reaction product of manganese phosphate and an acid diluted to a concentration of 10% in deionized water; and about 0.5–1 parts by weight of a cationic surfactant.

9. A cationic electrodeposition coating composition as claimed in claim 8, wherein said pigment paste composition comprises (a) about 15–30% by weight of pigment grinding vehicle (b) about 2–6% by weight of an anticorrosive pigment and (c) about 0.7–2.3% by weight of dibutyl tin oxide, a ratio of solid content of said pigment/pigment grinding vehicle being about 1/0.2–1/0.45.

10. A cationic electrodeposition coating composition as claimed in claim 9, wherein said pigment grinding vehicle is obtainable from about 25–35% by weight of polyglycidyl ether of bisphenol A, about 5–12% by weight of propyleneglycol monomethyl ether acetate, about 8–15% by weight of partially blocked isocyanate cross-linking agent, about 25–40% by weight of ethylene glycol monobutyl ether, about 10–20% by weight of organic tertiary amino acid salt and about 0–5% by weight of deionized water.

11. A cationic electrodeposition coating composition as claimed in claim 10, wherein an epoxy equivalent weight of said polyglycidyl ether of bisphenol A is in a range of about 900–1200.

12. A cationic electrodeposition coating composition as claimed in claim 9, wherein said anticorrsive pigment is at least one selected from the group consisting of bismuth hydroxide, bismuth trioxide, aluminum tri-polyphosphate hydrate and magnesium hydroxide carbonate hydrate.

13. A method of preparing a cationic electrodeposition coating composition comprising the steps of:

preparing a cationic electrodeposition resin in the presence of an organic solvent from (a) about 40–60% by weight of a cationic electrodeposition synthetic resin produced by an epoxy-amino addition reaction (b) about 5–10% by weight of an acrylic cationic electrodeposition resin having an amino group (c) about 1–3% by weight of a fatty acid ester resin synthesized by an esterification reaction of styrene-allylalcohol copolymer and fatty acid and (d) about 30–50% by weight of polyurethane cross-linking agent produced from a mixture of blocked polymethylene polyphenyl polyisocyanate and blocked isophorone diisocyanate;

air preparing an aqueous dispersion by mixing about 35–45 parts by weight of said cationic electrodeposition resin, about 55–65 parts by weight of deionized water, about 0.3–1.5 parts by weight of an acid for a neutralization, about 1–5 parts by weight of a reaction product of manganese phosphate and an acid diluted to a concentration of 10% in deionized water, and about 0.5–1 parts by weight of a cationic surfactant;

preparing a cationic electrodeposition resin dispersion by removing organic solvents having a low boiling point from said aqueous dispersion by extracting and then filtering; and mixing said resin dispersion of a cationic electrodeposition and a pigment paste composition.

14. A method of preparing a cationic electrodeposition coating composition as claimed in claim 13, wherein said acid reacting with said manganese phosphate is at least one selected from the group consisting of phosphoric acid, acetic acid formic acid, lactic acid and sulfamic acid.

15. A method of preparing a cationic electrodeposition coating composition as claimed in claim 13, wherein said extracting of said organic solvent is implemented at a temperature range of about 40–80° C. under a pressure range of about 30–90 mmHg.

16. A method of preparing a cationic electrodeposition coating composition as claimed in claim 13, wherein said acid for neutralization is at least one selected from the group consisting of acetic acid, lactic acid, phosphoric acid and formic acid.

\* \* \* \* \*